US005192592A

United States Patent [19]

Shay

[11] Patent Number: 5,192,592
[45] Date of Patent: Mar. 9, 1993

[54] METHOD OF COATING SUBSTRATES UTILIZING AN ALKALI-FUNCTIONAL ASSOCIATIVE THICKNER CONTAINING COATING COMPOSITION

[75] Inventor: Gregory D. Shay, Oak Forest, Ill.

[73] Assignee: Union Carbide Chemicals & Plastics Technology Corporation, Danbury, Conn.

[21] Appl. No.: 845,367

[22] Filed: Mar. 5, 1992

Related U.S. Application Data

[63] Continuation of Ser. No. 559,164, Jul. 30, 1990, abandoned.

[51] Int. Cl.$^5$ .............................................. B05D 3/12
[52] U.S. Cl. .................................. 427/358; 427/361; 427/428; 524/555; 524/813; 526/301
[58] Field of Search ............... 427/358, 361, 428, 290, 427/375, 483, 511, 516, 904; 524/555, 812, 813; 526/301

[56] References Cited

U.S. PATENT DOCUMENTS

| | | | |
|---|---|---|---|
| 4,284,546 | 8/1981 | Delfosse et al. | 427/361 X |
| 4,384,096 | 5/1983 | Sonnabend | 526/313 |
| 4,514,552 | 4/1985 | Shay et al. | 524/813 X |
| 4,542,175 | 9/1985 | Fink et al. | 524/555 X |
| 4,624,813 | 11/1986 | Long | 427/428 X |

FOREIGN PATENT DOCUMENTS 0190892 1/1986 European Pat. Off. .

OTHER PUBLICATIONS

"Associative Thickners in Paint Technology . . . ", J. Edward Glass 1988 Coating Conference, Tappi Proceedings, pp. 287-297.
"November 2 & 3, Desoto Visit", Wausau Papers Stationery Memorandum Dated Oct. 17, 1988 to Jerry Rex at Desoto, Inc., 2 Pages.
Letter to Wausau Paper From William Lamey, Jr., of Desoto, Inc. dated Oct. 27, 1988.
Letter dated Dec. 5, 1988, from Jerry D. Rex of Desoto Chemical Co., to Bill Hershey of Wausau Paper Company.
Memorandum dated Jan. 27, 1989 to Roger Dickson from Jerry Rex, both of Desoto, Inc.
Letter from Jerry Rex to Ms. Penny Mork of H. B. Fuller dated Mar. 10, 1989.
Letter from Leslie Nack, Dir. of Int'l Licensing, Desoto, Inc. N. Sakurai of Japan Synthetic Rubber Co., dated Mar. 15, 1989.
Letter from Fitzpatrick, Cella, Harper & Scinto, New York, Mr. Robert L. Baechtold, to Dressler, Goldsmith et al., Martin L. Katz, dated Oct. 10, 1990.
Letter dated Mar. 17, 1989 to Michael McEwen of Boise Cascade Pulp & Paper Research from Greg Shay of Desoto, Inc.
Two Paragraphs in a Report Entitled, "Pioneering Research Monthly", dated Mar., 1989, 2 Pages.
Letter from N. Sakurai of Japan Synthetic Rubber Co., Ltd. (JSR) to Mr. R. Wolf of Desoto, Inc. dated May 1989, received May 22, 1989.
Letter from W. L. Lamey of Desoto, Inc., to Mr. N. Sakurai of JSR dated May 25, 1989.
Letter dated Jun. 12, 1989 from Morris L. Owen of Ashland Chemical Co., to Jerry Rex of Desoto, Inc. 4 pages.
Desoto, Inc., Memorandum from Roger Dickson, dated Jun. 14, 1989, 3 pages.
Desoto, Inc., Memorandum from Buddy Witlock to Bob Fleming, "Polyphobe Samples", dated Aug. 14, 1989, 2 pages.
New Technology Bulletin, J. S. Aspler, No. 65, Aug., 1989, released by Pulp & Paper Research Institution of Canada.
Desoto, Inc. List dated Apr. 19, 1990, "Polyphobe Sample Submissions", 6 pages.

Primary Examiner—Michael Lusigan
Attorney, Agent, or Firm—S. H. Hegedus

[57] ABSTRACT

A method of coating a substrate with an aqueous coating composition that includes an alkali-swellable associative thickener is disclosed. The associative thickener is produced from a monoethylenically unsaturated carboxylic acid, a monoethylenically unsaturated monomer lacking surfactant capacity, a non-ionic urethane monomer, and, optionally, a polyethylenically unsaturated monomer.

15 Claims, No Drawings

METHOD OF COATING SUBSTRATES UTILIZING AN ALKALI-FUNCTIONAL ASSOCIATIVE THICKNER CONTAINING COATING COMPOSITION

This application is a continuation of prior U.S. application Ser. No. 07/559,164 filed July 30, 1990, now abandoned.

TECHNICAL FIELD

This invention relates to a method of coating substrates utilizing an aqueous coating composition that is thickened with an alkali-swellable associative thickener.

BACKGROUND OF THE INVENTION

Coating compositions are applied to substrates for many reasons, as for example to modify the color, brightness, whiteness, smoothness, gloss and/or porosity of the substrate. They can also be used to improve the ability of the surface of the substrate to receive additional coatings, ink and the like, and to increase the stiffness, strength, and/or weight of the substrate.

One problem with conventional roll applied coatings is incomplete transfer of the composition from an applicator roller to the substrate which can ruin the coated substrate surface. Transfer can be improved by lowering the solids content of the composition but this is undesirable because the excess water utilized to lower the solids content must subsequently be removed. The excess water can also weaken the substrate and permit the coating to be wicked into the substrate rather than remain on the surface.

A high solids content is desirable so that a single, thick coating can be obtained. A high solids content can also cause inadequate flow and leveling of the composition which results in uneven coating thickness and can cause webs to be formed between the composition applicator and the substrate.

Conventional (non-associative) thickeners can be added to attempt to solve these problems but coating compositions containing such thickeners also have processing problems.

For example, conventional thickener-containing compositions can have a high extensional viscosity which causes misting/spattering or pattern formation that can ruin the coated substrate.

The high extensional viscosity may also result in high blade pressure when the conventional thickener-containing composition is applied by a blade coater. High blade pressure requires a slower line speed or results in paper breaks and/or scratching of the substrate. Furthermore, the high blade pressure can undesirably force water and coating from the substrate.

Non-ionic associative thickener-containing compositions also exhibit low extensional viscosity, but because they are lower in molecular weight they are absorbed into the substrate and thus do not remain on the surface to improve it.

Conventionally coated substrates typically are of relatively poor quality and do not have the desired gloss, uniformity of appearance and print density. These problems are particularly apparent in the production of paper of newsprint quality.

U.S. Pat. No. 4,514,552 to Shay et al. discloses alkali soluble latex thickeners suitable for use as associative thickeners. However, the Shay Patent does not disclose or suggest the use of these thickeners in a method of coating substrates.

SUMMARY OF THE INVENTION

The method of the present invention comprises the step of applying to a substrate an aqueous coating composition comprising an alkali-swellable associative thickener that comprises (A) about 2 to about 70 weight percent of a monoethylenically unsaturated carboxylic acid, (B) about 20 to 80 weight percent of a monoethylenically unsaturated monomer lacking surfactant capacity, (C) about 0.5 to about 50 weight percent of a non-ionic urethane monomer that is the urethane reaction product of a monohydric non-ionic surfactant and a monoethylenically unsaturated monoisocyanate, and (D) 0 to about 2 weight percent of a polyethylenically unsaturated monomer. The weight percents of the components of the associative thickener are based on the total weight of associative thickener.

The method of the present invention provides improved transfer, flow and leveling characteristics and reduced webbing, misting/spattering and pattern formation.

Furthermore, the method of the present invention enhances the properties of the coated substrate by providing a thicker film, a higher gloss, a more uniform appearance and a superior print density as compared to substrates coated by a conventional method.

When a blade coater is utilized to apply the composition, lower blade pressure can be utilized which results in increased line speed without scratching the substrate. Also, lower blade pressure does not force water into substrates such as paper.

The size coating composition utilized in the method of the present invention can be produced by admixing the associative thickener with a conventional aqueous composition that can contain an elastomer, pigment, filler, binder, and water. Preferably, the conventional aqueous composition is latex based.

The associative thickeners utilized in the method of the present invention are anionic and have a relatively high number average molecular weight thereby retaining water better than conventional thickeners. Thus, the associative thickener containing compositions are not absorbed into the substrate and produce improved coatings compared to nonionic associative thickeners.

The coating compositions utilized in the present invention can possess a viscosity higher than can conventionally be utilized and still achieve good transfer of the composition to the substrate. This permits an increase in the solids content of the coating composition and/or an increase in the line speed. Lower solids coatings can also be applied, if desired, by using more of the alkali-swellable associative thickener to increase the viscosity.

DETAILED DESCRIPTION OF THE PREFERRED EMBODIMENTS

The method of the present invention comprises the step of applying to a substrate an aqueous coating composition comprising an alkali-swellable associative thickener comprising (A) about 20 to about 70 weight percent, based on the weight of the associative thickener, of an alpha, beta-monoethylenically unsaturated carboxylic acid; (B) about 20 to about 80 weight percent of a monoethylenically unsaturated monomer lacking surfactant capacity; (C) about 0.5 to about 60 weight percent of a non-ionic urethane monomer that is the urethane reaction product of a monohydric non-ionic surfactant, and a monoethylenically unsaturated monoisocyanate; and (D) 0 to about 2 weight percent of a polyethylenically unsaturated monomer to a substrate. The above components of the alkali-swellable thickener are copolymerized by conventional emulsion copolymerization processes and are anionic. Alkali-swellable associative thickeners that can be used herein are disclosed in U.S. Pat. No. 4,514,552 to Shay et al. (the Shay Patent) which is incorporated herein by reference.

The term "associative thickener", as used in its various grammatical forms, indicates that the thickening mechanism is predominantly associative.

In contrast, the thickening mechanism of non-associative thickeners, i.e., conventional thickeners, thickens only the aqueous phase by a hydrodynamic mechanism.

Compositions containing associative thickeners generally have a relatively low extensional viscosity while compositions containing non-associative thickeners have a relatively high extensional viscosity. This difference in extensional viscosity is due to the difference in thickening mechanisms of the associative and non-associative thickeners. The low extensional viscosity of the coating compositions utilized in the method of the present invention is presently believed to result in improved transfer and reduced webbing, misting/spattering and pattern formation of the coating composition and the ability to utilize a low blade pressure when a blade coater is utilized to apply the composition.

Extensional viscosity is a measure of the resistance to elongational flow that occurs when a fluid, e.g., a coating composition, is forced through an aperture of the applicator, such as the nip between rollers, the space between a blade and a substrate, or the orifice of a spray nozzle. The fluid is extended which results in an increase in viscosity as it approaches the aperture. Most viscometers, e.g., a Brookfield viscometer, impart rotational flow on the liquid whose viscosity is being measured and hence only measure rotational shear viscosity. Extensional viscosity is important when roller, blade or spray applicators are utilized because it can be as much as a 1000 times greater than the rotational shear viscosity.

The associative thickener-containing coating compositions have a relatively high viscosity when subjected to a high-rotational shear force such as the force imparted on the composition by the applicator. This relatively high viscosity is presently believed to result in the formation of thicker films.

The associative thickener-containing coating compositions have a relatively low viscosity when subjected to a low-rotational shear force such as the force imparted on the composition by gravity. This relatively low viscosity is presently believed to result in improved flow and leveling of the composition.

Preferably, the unsaturated carboxylic acid is present in an amount in the range of about 25 to about 55 weight percent; the unsaturated monomer lacking surfactant capacity is present in an amount in the range of 30 to about 65 weight percent; and the non-ionic urethane monomer is present in an amount in the range of about 10 to about 50 weight percent.

The unsaturated carboxylic acid enables the emulsion copolymerized particles of the associative thickener to be dispersed in an aqueous medium, e.g., a conventional coating composition, without the assistance of the surfactant that is used to stabilize the emulsion during copolymerization.

The unsaturated carboxylic acid is present in an amount sufficient to disperse the associative thickener in an aqueous medium having a pH of at least 6.0, preferably at least about 7.0, and most preferably a pH in the range of about 7.5 to about 10.5.

Although acrylic acid or methacrylic acid are preferred unsaturated carboxylic acids, other useful acids are crotonic acid, itaconic acid, maleic acid, fumaric acid and the like.

The unsaturated monomer lacking surfactant capacity can be any monoethylenically unsaturated monomer that is copolymerizable with the carboxylic acid and the other monomers in the composition and that provides a copolymer that is substantially insoluble in water in the absence of alkali conditions, i.e., a pH of at least about 7.0.

It is preferred to utilize unsaturated monomers lacking surfactant capacity in which the single ethylenic group is the only group which is reactive under the conditions of copolymerization. The unsaturated monomers lacking surfactant capacity can have groups that are reactive during cure of the composition, e.g., hydroxyethyl acrylate.

These unsaturated monomers are usually acrylate or methacrylate esters, e.g., ethyl acrylate, butyl acrylate, methyl acrylate and the like, and the corresponding methacrylates. Other unsaturated monomers, e.g., styrene, vinyl acetate, vinyl toluene, vinylidene chlorides, acrylonitrile and the like, are also useful. Admixtures of the unsaturated monomers can also be utilized.

The non-ionic urethane monomer is a conventional urethane reaction product of a monohydric non-ionic surfactant with a monoethylenically unsaturated monoisocyanate. As disclosed in the Shay Patent, the surfactant is a hydrophobe carrying a polyalkoxylate chain and is terminated with a single hydroxy group. The polyalkoxylate chain preferably has at least 2 carbon atoms. When the hydroxy group of the surfactant is reacted with the unsaturated monoisocyanate a urethane linkage is formed and the hydrophobe is linked with the ethylenically unsaturated group which is available for copolymerization.

The preferred surfactants have the formula:

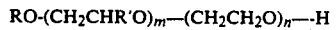

$$RO\text{-}(CH_2CHR'O)_m\text{-}(CH_2CH_2O)_n\text{-}H$$

wherein R is an alkyl group containing 6 to 22 carbon atoms (typically dodecyl) or an alkaryl group containing 8 to 22 carbon atoms (typically octyl or nonyl phenol), R' is a $C_1$ to $C_4$ alkyl group (typically methyl), n is an average number from about 6 to 150, and m is an average number of from 0 to 50 provided n is at least as great as m and n+m=6 to 150.

A preferred monohydric non-ionic surfactant is an ethoxylated aliphatic alcohol or alkyl phenol wherein a carbon chain containing at least 6 carbon atoms provides the hydrophobic portion of the surfactant, e.g., an ethoxylate of nonyl phenol.

The monoethylenically unsaturated monoisocyanate can be produced from the reaction of a copolymerizable unsaturation-containing group and an organic diisocyanate.

The copolymerizable unsaturation-containing group can have ethylenic unsaturation provided by an acrylate, methacrylate or allylic group (as provided by allyl alcohol). Preferably, the copolymerizable unsaturation-containing group is hydroxy-functional and can be produced by reacting a $C_2$ to $C_4$ monoepoxide, e.g., ethylene oxide, propylene oxide, and butylene oxide, with acrylic or methacrylic acid to produce a hydroxy ester.

An organic diisocyanate is reacted in equimolar proportions with the copolymerizable unsaturation-containing group. Representative of the organic diisocyanates are toluene diisocyanate and isophorone diisocyanate.

A preferred ethylenically unsaturated monoisocyanate is styryl, as in alpha, alpha-dimethyl-m-isopropenyl benzyl isocyanate which is commercially available.

The polyethylenically unsaturated monomer is conventionally utilized in alkali soluble emulsion copolymers. Representative of these polyethylenically unsaturated monomers are ethylene glycol diacrylate, ethylene glycol dimethacrylate, 1,6-hexanediol diacrylate, 1,6-hexanediol dimethylacrylate, diallyl benzene, and the like.

The associative thickeners of the present invention are produced by emulsion copolymerization of the monoethylenically unsaturated carboxylic acid, the unsaturated monomer lacking surfactant capacity, the non-ionic urethane monomer, and the optional polyethylenically unsaturated monomer.

A representative associative thickener for use in the method of the present invention is the Thickener Example 7 of the Shay Patent which is produced by copolymerizing 40 parts of methacrylic acid, 35 parts of ethyl acrylate 25 parts of a urethane monomer, all parts being by weight.

The aqueous composition typically include an elastomer, pigment, filler, binder, and water. Preferably the elastomer is a latex such as a styrene-butadiene latex. The aqueous composition can produce a non-adhesive, water-activated adhesive or pressure activated adhesive coating.

The active associative thickener is present in the coating composition in an amount in the range of about 0.005 to about 2, preferably about 0.01 to about 0.5, weight percent based on the solids content of the coating composition.

The solids content of the aqueous coating composition utilized in the present method is preferably in the range of about 30 to about 65 percent, most preferably about 35 to about 60 percent by weight.

After the associative thickener is admixed with the conventional aqueous composition the resultant coating composition is neutralized with an alkali such as ammonium, sodium or potassium hydroxide or an amine. Alternatively, the associative thickener can be neutralized before it is added to the conventional aqueous composition.

The coating compositions of the present invention can be applied to a substrate capable of receiving the coating compositions by conventional coating techniques such as blade, roll, curtain, air knife, spray, etc. After the composition is applied, it is cured using heat to remove the water which results in coagulation that produces a cured coating.

Representative substrates are paper, e.g., paper made from vegetation and/or plastic, cardboard, films, e.g., polyethylene films and Mylar ® films, yarns, fabrics, leather and the like. Preferred substrates are selected from the group consisting of paper, cardboard, films, yarns, fabrics and leather.

Paper coated with the cured coating compositions can be utilized as newsprint stock, packaging material, wallpaper stock, printers stock, and the like.

The following Examples are presented by way of illustration of preferred embodiments of the present invention, and not limitation.

EXAMPLE 1

Coating Composition and Paper Coating Method Utilizing a Size Press

An aqueous size coating composition for use in the method of the present invention was prepared by admixing the alkali-swellable associative thickener PP-101, commercially available from DeSoto, Inc., Des Plaines, Ill., and a conventional aqueous composition including a styrene-butadiene latex, clay, starch and calcium carbonate. The associative thickener concentration was 0.014 weight percent based on the solids content of the size coating composition. The rotational shear viscosity of the size coating composition was about 200 centipoise (cp). The solids content of the size coating composition was about 40 weight percent.

This size coating composition was applied to paper utilizing a size press. The line speed during coating was about 1,200 to about 1,750 feet per minute. The paper utilized was high quality Gravure #1 having a weight of 60 pounds per 3,300 square feet. The weight of the coating applied to the paper was 7 pounds per 3,300 square feet.

The amount of associative thickener utilized is about 1/5$^{th}$ the amount of the conventional thickener hydroxy propyl methyl cellulose, commercially available from Dow under the trade designation Methocel, conventionally utilized and the line speed was higher than can be obtained utilizing a composition containing this conventional thickener.

The paper exhibited improved surface smoothness and gloss and had a print quality comparable to that which can be attained utilizing an off-machine coater, e.g., a roll or blade coater.

EXAMPLE 2

Coating Composition and Paper Coating Method Utilizing a Reverse Roll Coater

An aqueous size coating composition for use in the method of the present invention was prepared by admixing the alkali-swellable associative thickener PP-102, commercially available from DeSoto, Inc., Des Plaines, Ill., and a conventional aqueous composition including a styrene-butadiene latex, clay, starch, calcium carbonate and ink capsules. The associative thickener concentration was 0.16 weight percent based on the solids content of the size coating composition. The rotational shear viscosity of the size coating composition was about 3000 cp. The solids content of the size coating composition was about 50 weight percent.

This size coating composition was applied to paper utilizing a reverse roll coater. The coating speed was about 1,000 to about 2,000 feet per minute. The paper utilized was newsprint having a weight of 28 pounds per 3,300 square feet. The weight of the coating applied to the paper was 5 pounds per 3,300 square feet.

Unlike conventionally thickened coating compositions, this size coating composition transferred completely from the roller to the substrate with no webbing, misting/spattering or pattern formation.

EXAMPLE 3

Coating Composition and Paper Coating Method Utilizing a Short Dwell Blade Coater An aqueous size coating composition for use in the method of the present invention was prepared by admixing 0.3 parts, on a solids basis, of the alkali-swellable associative thickener PP-101 commercially available from DeSoto, Inc., Des Plaines, Ill., and a conventional aqueous composition including 6 parts of a styrene-butadiene latex and 6 parts clay. The associative thickener concentration utilized was 0.17 weight percent based on the solids content of the size coating composition. The rotational shear viscosity of the size coating composition was about 3,500 cp. The solids content of the size coating composition was about 60 weight percent.

This size coating composition was applied to paper utilizing a short dwell blade coater. The coating speed was about 3,200 to about 4,000 feet per minute. The paper utilized was fine Gravure having a weight of 28 pounds per 3,300 square feet. The weight of the coating applied to the paper was about 5.5 to about 6.5 pounds per 3,300 square feet.

Very good coatability was obtained. The present method utilized a lower blade pressure as compared to compositions containing a conventional thickener which is desirable for faster coater speeds without scratching and for improved water retention of the paper.

What is claimed is:

1. A high speed roll or blade method of coating a substrate comprising the step of applying to a substrate selected from the group consisting of paper, cardboard, films, yarns, fabrics and leather, an aqueous coating composition comprising an alkali-swellable associative thickener comprising (A) about 2 to about 70 weight percent, based on the total weight of associative thickener, of an alpha, beta-monoethylenically unsaturated carboxylic acid, (B) about 20 to about 80 weight percent of a monoethylenically unsaturated monomer lacking surfactant capacity, (C) about 0.5 to about 50 weight percent of a non-ionic urethane monomer that is the reaction product of a monohydric non-ionic surfactant and a monoethylenically unsaturated monoisocyanate, and (D) 0 to about 2 weight percent of a polyethylenically unsaturated monomer.

2. The method in accordance with claim 1 wherein the monoethylenically unsaturated carboxylic acid is present in an amount in the range of about 25 to about 55 weight percent.

3. The method in accordance with claim 1 wherein the monoethylenically unsaturated monomer is present in an amount in the range of about 30 to about 60 weight percent.

4. The method in accordance with claim 1 wherein the non-ionic urethane monomer is present in an amount in the range of about 10 to about 50 weight percent.

5. The method in accordance with claim 1 wherein the monoethylenically unsaturated carboxylic acid is present in an amount in the range of about 25 to about 55 weight percent, the monoethylenically unsaturated monomer lacking surfactant capacity is present in an amount in the range of about 30 to about 65 weight percent, and the non-ionic urethane monomer is present in an amount in the range of about 10 to about 50 weight percent.

6. The method in accordance with claim 1 wherein the monoethylenically unsaturated carboxylic acid is methacrylic acid.

7. The method in accordance with claim 1 wherein the monoethylenically unsaturated monomer is ethyl acrylate.

8. The method in accordance with claim 1 wherein the non-ionic urethane monomer contains styryl unsaturation.

9. The method in accordance with claim 1 wherein the monohydric non-ionic surfactant has the formula:

$$RO-(CH_2CHR'O)_m-(CH_2CH_2O)_n-H$$

wherein which R is an alkyl group containing 6 to 22 carbon atoms or an alkaryl group containing 8 to 22 carbon atoms, R' is a $C_1$ to $C_4$ alkyl group, n is an average number from about 6 to 150, and m is an average number of from 0 to 50 provided n is at least as great as m and $n+m=6$ to 150.

10. A high speed roll or blade method of coating a substrate comprising the step of applying to the substrate selected from the group consisting of paper, cardboard, films, yarns, fabrics, and leather, an aqueous coating composition comprising an alkali-swellable associative thickener comprising about 25 to about 55 weight percent, based on the total weight of associative thickener, of a monoethylenically unsaturated carboxylic acid, about 30 to about 65 weight percent of a monoethylenically unsaturated monomer lacking surfactant capacity, and about 10 to about 50 weight percent of a non-ionic urethane monomer that is the reaction product of a monohydric non-ionic surfactant and a monoethylenically unsaturated monoisocyanate.

11. The method in accordance with claim 10 wherein the monoethylenically unsaturated carboxylic acid is methacrylic acid.

12. The method in accordance with claim 10 wherein the monoethylenically unsaturated monomer (B) is ethyl acrylate.

13. The method in accordance with claim 10 wherein the non-ionic urethane monomer contains styryl unsaturation.

14. The method in accordance with claim 10 wherein the monohydric non-ionic surfactant has the formula:

$$RO-(CH_2CHR'O)_m-(CH_2CH_2O)_n-H$$

wherein R is an alkyl group containing 6 to 22 carbon atoms or an alkaryl group containing 8 to 22 carbon atoms, R' is a $C_1$ to $C_4$ alkyl group, n is an average number from about 6 to 150, and m is an average number of from 0 to 50 provided n is at least as great as m and $n+m=6$ to 150.

15. The method in accordance with claim 10 wherein the monohydric non-ionic surfactant is an ethoxylate of nonyl phenol.

* * * * *